United States Patent Office 3,315,954
Patented Apr. 25, 1967

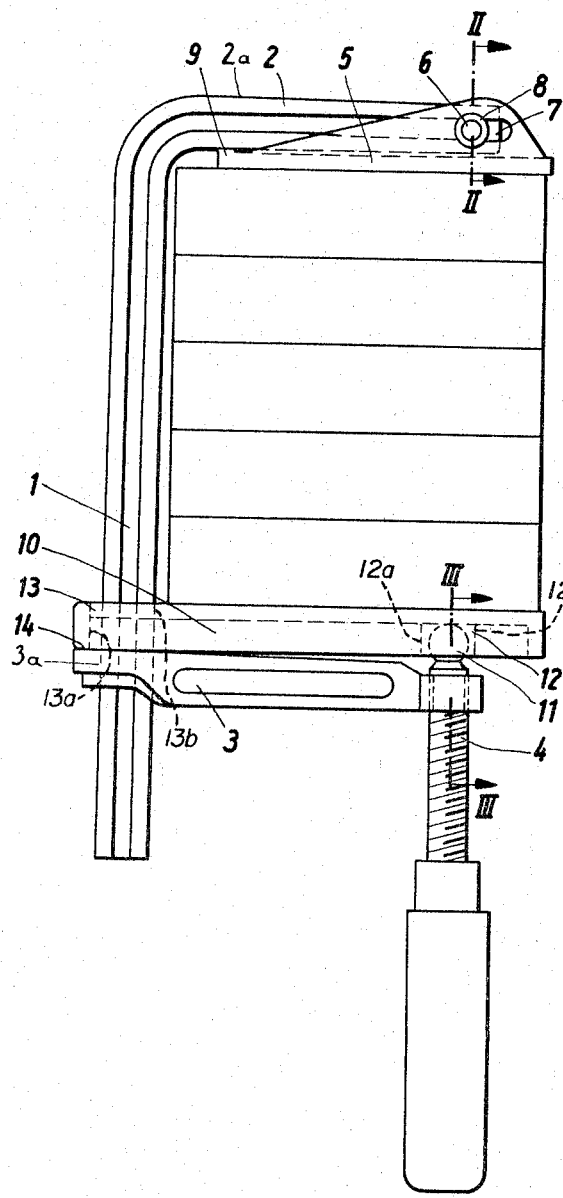

3,315,954
CLAMP
Eugen Mayer, Wolfsweg, Bietigheim,
Wurttemberg, Germany
Filed Aug. 3, 1964, Ser. No. 386,861
Claims priority, application Germany, Aug. 5, 1963,
M 57,732
7 Claims. (Cl. 269—167)

The present invention has reference to an improved clamp or vise comprising a guide rail, an end portion bent at substantially right angles which forms a stationary jaw or bracket, and a displaceable sliding jaw or bracket carrying a tensioning or tightening element.

Known clamps or vises of this type yield considerably elastically during clamping of large workpieces. The pressure piece usual with such known clamps, during tightening of the tensioning element constructed in the form of a tensioning spindle or also a tensioning lever, slips or slides along at the clamping location on the surface of the workpiece for such time until the clamp assumes an equilibrium position corresponding to the elastic yielding or deflection. It has been found that as a result of such action the damage to the workpiece resulting from relative movement of the pressure piece or member with respect to the surface of the workpiece is very disadvantageous.

Accordingly, it is an important object of the present invention to provide an improved clamp or vise which considerably prevents the aforementioned disadvantages.

A further important object of the present invention has reference to the provision of an improved clamp of the type described which is relatively simple in construction, economical to manufacture, easy to operate, and effectively clamps workpieces without surface damage.

In accordance with the teachings of the present invention the mentioned relative movement and the therewith associated damage to the surface of the workpiece are prevented in that, the jaws in each case have associated therewith a lengthwise extending support plate which is lengthwise displaceably mounted and which brace or support themselves at the associated jaw in the region of the guide rail via a support or bearing stop.

On account of the thereby given possibility of lengthwise displacement of the support plates forming the pressure pieces or plates relative to the jaws carrying them, these support plates during tightening of the clamp always remain snugly bearing against the workpiece. In so doing, the arrangement of the support stops in the region of the guide rail, during clamping of the workpiece, renders possible parallel positioning of the support plates with respect to one another. Both support plates bear against the workpiece with the same clamping pressure in the direct region of the guide rail as well as also at the respective opposite end.

The attachment of the clamp takes place in that both support plates are brought into snug bearing contact with the workpiece. During tightening of the tensioning or tightening element the long support plates in the region of the guide rail brace themselves via their support stops at the stationary jaw and the sliding jaw. Both of the jaws begin to slide along the support plates which, in turn, remain in snug or intensive bearing contact with the workpiece.

This mentioned possibility of lengthwise displacement for the support plate arranged at the stationary jaw is achieved in accordance with the invention in that such support plate is pivotably mounted via a bolt at the stationary jaw, such bolt penetrating a lengthwise slot rendering possible such lengthwise displacement.

The possibility of lengthwise displacement for the support plate arranged at the sliding jaw is given, in accordance with the invention in that, such support plate exhibits an elongated slot rendering possible its movement relative to the guide rail and that said support plate is provided with an undercut lengthwise guide in the region of the point of engagement of the tightening or tensioning element for receiving the pressure piece of the aforesaid tightening element.

Other features, objects and advantages of the invention will become apparent by reference to the following detailed description and drawing in which:

FIGURE 1 is a side view of a preferred embodiment of clamp or vise according to the invention, illustrating a clamped workpiece;

FIGURE 2 is a cross-sectional view through the articulation of the support plate at the stationary jaw of the inventive clamp or vise, taken along lines II—II of FIGURE 1; and FIGURE 3 is a cross-sectional view through the sliding jaw as well as the support plate associated therewith in the region of the point of engagement of the tightening element, taken along lines III—III of FIGURE 1.

Describing now the drawing, it will be seen that the inventive clamp or vise incorporates a guide rail 1 possessing an end portion 2a bent at substantially a right-angle and which forms a stationary jaw 2. A sliding jaw 3 having a slot 3a is displaceable upon the guide rail 1, this sliding jaw 3 carries a tensioning element, in the present case in the form of a tensioning spindle 4. A U-shaped support plate 5 provided for the stationary jaw 2 is pivotable about a pivot bolt 6 seated in the stationary jaw 2, as best shown in FIGURE 2. A lengthwise slot 7 formed in the U-shaped support plate 5 permits lengthwise displacement of the aforesaid support plate 5. A washer or supporting disk 8 fixedly riveted to the pivot bolt 6 secures the latter from dropping-out.

The portion of the support plate 5 facing the guide rail 1 carries a support stop 9 confronting the stationary jaw 2. Likewise, a support plate 10 is provided for the displaceable slide or sliding jaw 3 upon which acts a pressure piece in the form of head 11 of the tightening or tensioning spindle 4. For the illustrated embodiment incorporating a head 11 constructed in substantially spherical form, there is provided at the support plate 10 an undercut lengthwise guide 12 extending between the surfaces designated 12a, 12b and which engages the aforesaid head 11. As a result, this head 11 is arranged in form-locking connection with the support plate 10. The support plate 10 is likewise provided with an elongated slot 13 extending between the surfaces 13a, 13b and rendering possible its movement relative to the guide rail 1. A support stop 14 of the support plate 10 provided in the region of the guide rail 1 can slide along upon the sliding jaw 3.

The inventive clamp or vise incorporating the lengthwise extending support plates 5 and 10 is thereby characterized by the possibility of displacement of the support plates 5 and 10 with respect to the jaws 2 and 3 respectively, as well as the possibility of support or bracing in the region of the guide rail 1. As a result, there is achieved the advantage that the support plates 5 and 10 during clamping remain in intensive or compact contact with the workpiece, while the jaws 2 and 3 of the clamp displace themselves for such time until an equilibrium for all forces appearing in the clamp is obtained. Locations of wear at the workpiece can therefore not appear. Additionally, there is positively obtained a uniform specific clamping pressure.

It will be appreciated and understood that in place of the tightening or tensioning spindle 4 there can, of course, also be employed a tightening element in the form of a tightening lever having tightening cams.

While there is shown and described a present preferred embodiment of the invention it is to be distinctly understood that the invention is not limited therto but may be otherwise variously embodied and practised within the scope of the following claims.

What is claimed is:

1. A clamp comprising a guide rail, an end portion bent at substantially right angles which forms a stationary jaw, a sliding jaw displaceably supported by said guide rail, a tightening element carried by said sliding jaw, a respective lengthwise extending support plate provided for said stationary jaw and said sliding jaw, each lengthwise extending support plate being displaceably mounted relative to the longitudinal axis of the associated jaw, and a support stop provided for each support plate for bracing each support plate against its associated jaw in the region of said guide rail.

2. A clamp as defined in claim 1, said support plate associated with said stationary jaw being provided with slot means rendering possible lengthwise displacement of said support plate, bolt means for pivotably mounting the associated support plate to said stationary jaw, said bolt means piercingly extending into said slot means.

3. A clamp as defined in claim 1, said support plate associated with said sliding jaw being provided with slot means for receiving said guide rail and for permitting relative movement of said support plate with respect to said guide rail.

4. A clamp as defined in claim 1, said tightening element including a pressure piece, said support plate associated with said sliding jaw being provided at the location of engagement of the tightening element with an undercut lengthwise guide for receiving said pressure piece of said tightening element.

5. A clamp as defined in claim 4, wherein said pressure piece comprises a substantially spherical head, said lengthwise guide being dimensioned with respect to said spherical head which engages in said lengthwise guide.

6. A clamp as defined in claim 1 wherein said support plate associated with said sliding jaw is provided with slot means for receiving said guide rail, said support stop for said support plate associated with said sliding jaw being provided at an outer end of said sliding jaw which terminates at said slot means.

7. A clamp for workpieces comprising a substantially L-shaped guide rail including an end portion bent at substantially right angles which forms a stationary jaw, a sliding jaw displaceably supported by said guide rail, a tightening element carried by said sliding jaw, a respective lengthwise extending support plate provided for said stationary jaw and said sliding jaw, each lengthwise extending support plate being displaceably mounted relative to the longitudinal axis of the associated jaw, and a support stop provided for each support plate for bracing each support plate against its associated jaw in the region of said guide rail.

References Cited by the Examiner

UNITED STATES PATENTS

| | | | |
|---|---|---|---|
| 267,152 | 11/1882 | Cloud | 269—171 |
| 851,398 | 4/1907 | Broadbooks | 269—147 |
| 983,148 | 1/1911 | Krumhaar et al. | 260—171.5 |

ROBERT C. RIORDON, *Primary Examiner.*

E. SUTTON, *Assistant Examiner.*